United States Patent [19]

Kabe et al.

[11] Patent Number: 4,724,878
[45] Date of Patent: Feb. 16, 1988

[54] HEAVY-DUTY PNEUMATIC RADIAL TIRE TREAD WITH NARROW GROOVE NEAR SHOULDER

[75] Inventors: Kazuyuki Kabe, Tokyo; Masahiko Kanamaru, Zushi; Ken Takahashi, Atsugi, all of Japan

[73] Assignee: The Yokohama Rubber Co., Ltd., Tokyo, Japan

[21] Appl. No.: 43,391

[22] Filed: Apr. 28, 1987

[30] Foreign Application Priority Data

Mar. 26, 1987 [JP] Japan .................................. 62-70420

[51] Int. Cl.$^4$ .............................................. A60C 11/00
[52] U.S. Cl. .................... 152/209 R; 152/454
[58] Field of Search ................ 152/209 R, 209 D, 454

[56] References Cited

U.S. PATENT DOCUMENTS

| | | | |
|---|---|---|---|
| 4,214,618 | 7/1980 | Takigawa et al. | 152/209 R |
| 4,262,721 | 4/1981 | Tadokoro et al. | 152/209 R |
| 4,262,722 | 4/1981 | Takigawa et al. | 152/209 R |
| 4,271,886 | 6/1981 | Bochmann et al. | 152/209 R |
| 4,282,914 | 8/1981 | Takigawa et al. | 152/209 D |
| 4,480,671 | 11/1964 | Giron | 152/209 R |

*Primary Examiner*—Michael Ball
*Attorney, Agent, or Firm*—Armstrong, Nikaido, Marmelstein & Kubovcik

[57] ABSTRACT

A heavy duty pneumatic radial tire, wherein a main area of contact with the road provided on a tread surface is formed with a circular arc, having a large radius of curvature, which crosses another circular arc having a small radius of curvature, Ra, to form an edge-shaped boundary, said radius of curvature, Ra, being larger than the depth of main grooves provided in said main area of contact with the road and smaller than the value five times as much as the depth of said main grooves, wherein narrow grooves provided on the shoulder portions are linearly provided in the circumferential direction of the tire and at a distance of 1.5 to 5 mm away towards the center of the tread surface from said edge-shaped boundary and have a groove width in the range of 1.5 to 5 mm, the direction of said narrow groove being inclined at an angle in the range of 1° to 5° relative to the perpendicular to the rotating shaft of the tire, the bottoms of said narrow grooves and the bottoms of said main grooves being present on an imaginary line drawn parallel to the circular arc of said main area of contact with the road, and wherein the widths of the partitioned ribs, located on the side of the center of the tread surface, among the partitioned ribs formed by partition with said narrow grooves, are equal to or larger than the maximum width of the remaining ribs which are present near the center of the tread surface as compared with said partitioned ribs.

6 Claims, 2 Drawing Figures

HEAVY-DUTY PNEUMATIC RADIAL TIRE TREAD WITH NARROW GROOVE NEAR SHOULDER

BACKGROUND OF THE INVENTION

This invention relates to a heavy-duty pneumatic radial tire used for vehicles, such as trucks and buses, and more particularly to a heavy-duty pneumatic radial tire improved with respect to the prevention of a wandering phenomenon.

In recent years, radial tires are used for heavy-duty vehicles, such as trucks and buses, as well. They exhibit unique excellent high speed performance, wear resistance and low fuel consumption. In order to withstand a heavy load, heavy-duty radial tires are provided on their tread portions with a reinforcing belt, thereby remarkably increasing the stiffness of the tread portion. Further, they are used in such a state that they are filled with air so as to give a high internal pneumatic pressure.

However, when such a heavy-duty radial tire, provided with a tread portion having high stiffness and filled with air so as to give high internal pneumatic pressure, travels on a road having a "rut", it receives excessive external force from the road surface, where it gets out of the rut. This makes it impossible to control the steering wheel, i.e., causes the so-called "wandering phenomenon." The wandering phenomenon is characteristic of heavy-duty radial tires, and is not caused with bias tires and radial tires for relatively light-duty vehicles such as passenger cars.

Since camber thrust is a major causative factor of the wandering phenomenon, tires having rounded shoulders were proposed in order to prevent this phenomenon. However, no fully satisfactory function of preventing the wandering phenomenon could be attained merely by rounding the shoulders of tires, though some improvement was recognized when compared to conventional tires having square shoulders.

For this reason, there have been proposed a tire having not only rounded shoulders but also narrow zigzag grooves provided on the inside of each shoulder along the circumferential direction of the tire, as disclosed in U.S. Pat. No. 4,214,618 (corresponding to Japanese patent publication No. 56-40044), and a tire having lateral ribs which have been formed on rounded shoulders by partition with narrow grooves so that they have a height lower than that of the ribs provided on the inside of the lateral ribs, thereby proving a difference in level therebetween, as disclosed in U.S. Pat. No. 4,480,671 (corresponding to Japanese patent application Kokai Publication No. 58-194606).

In the former tire, the narrow grooves have a zigzag shape. Therefore, the width of the lateral ribs periodically varies along the circumferential direction of the tire. In other words, the stiffness of the lateral ribs varies along the circumferential direction of the tire. This causes in an early stage an uneven wear such that the shoulder portions are worn into polygonal shapes, which deteriorates the cornering performance of the tire. On the other hand, the latter tire has a difference in level between the lateral ribs and the ribs provided on the inside thereof. The difference in level tends to accelerate the wear of the shoulder portions, leading to uneven wear.

Studies conducted by the present inventors revealed that the wandering preventing performance of a heavy-duty radial tire can be further improved by providing the narrow grooves near the edges of the shoulder portions as much as possible and, at the same time, narrowing the width of the lateral ribs. In the above-mentioned conventional tires, the wandering preventing performance was not always satisfactory, since the narrow grooves are arranged at a relatively long distance from the edges of the shoulder portions.

On the other hand, when the narrow grooves are provided near the edges of the shoulder portions as much as possible, the wandering preventing performance can be improved. However, this method lowers the stiffness of the lateral ribs, which raises another problem that cracks tend to occur at the bottom of the narrow grooves. If the narrow grooves are provided too near the center of the tread in order to eliminate this disadvantage, not only the wandering preventing performance is spoiled but also the wear resistance is lowered due to the decrease in the tread development width. As is apparent from the foregoing description, mere change in the position of the narrow grooves does not lead to satisfactory solution to the problems accompanying the improvement in the wandering preventing performance.

SUMMARY OF THE INVENTION

An object of the present invention is to provide a heavy-duty pneumatic radial tire having a further improved wandering preventing performance.

Another object of the present invention is to provide a heavy-duty pneumatic radial tire having a further improved wandering preventing performance without sacrificing wear resistance as well as without occurrence of cracking at the bottom of the narrow grooves provided on the shoulder portions.

In order to attain the above-mentioned objects, the radial tire of the present invention is comprised mainly of a carcass comprising at least one layer, a reinforcing belt comprising at least two metal cord layers and provided on the outer periphery of the tread portions, a plurality of ribs formed in the main tread area of contact with the road and partitioned by a plurality of main grooves extending into the circumferential direction of the tire, narrow grooves provided in the ribs located in the shoulder portions and having a width narrower than that of the main grooves, and an auxiliary area of contact with the road provided at the edge of each of both shoulder portions and having a round shape.

In the radial tire of the present invention having the above-mentioned constitution, the main area of contact with the road is formed with one circular arc having a large radius of curvature. This circular arc crosses another circular arc having a small radius of curvature, $R_a$, and forming the above-mentioned auxiliary area of contact with the road, thereby forming an edge-shaped boundary. The radius of curvature, $R_a$, is larger than the depth of the main grooves but is smaller than the value five times as much as the depth of the main grooves.

Further, in the radial tire of the present invention, the above-mentioned narrow grooves are provided as follows. They are formed linearly in the circumferential direction of the tire and at a distance of 1.5 to 5 mm away towards the center of the tread surface from the edge-shaped boundary. They have a groove width in the range of 1.5 to 5 mm and are inclined by 1° to 5° towards the inside of the tire relative to a perpendicular to the rotating shaft of the tire. Further, they are provided such that the bottom of the grooves is located together with the bottom of the main grooves on an imaginary line drawn parallel to the circular arc of the main area of contact with the road.

Moreover, in the radial tire of the present invention, the width of the partitioned ribs, among the ribs of the shoulder portions, which have been partitioned towards the center of the tread surface, is equal to or larger than the maximum width of the remaining ribs located more inside than the partitioned ribs.

DETAILED DESCRIPTION OF THE PREFERRED EMBODIMENT

Figure 1:
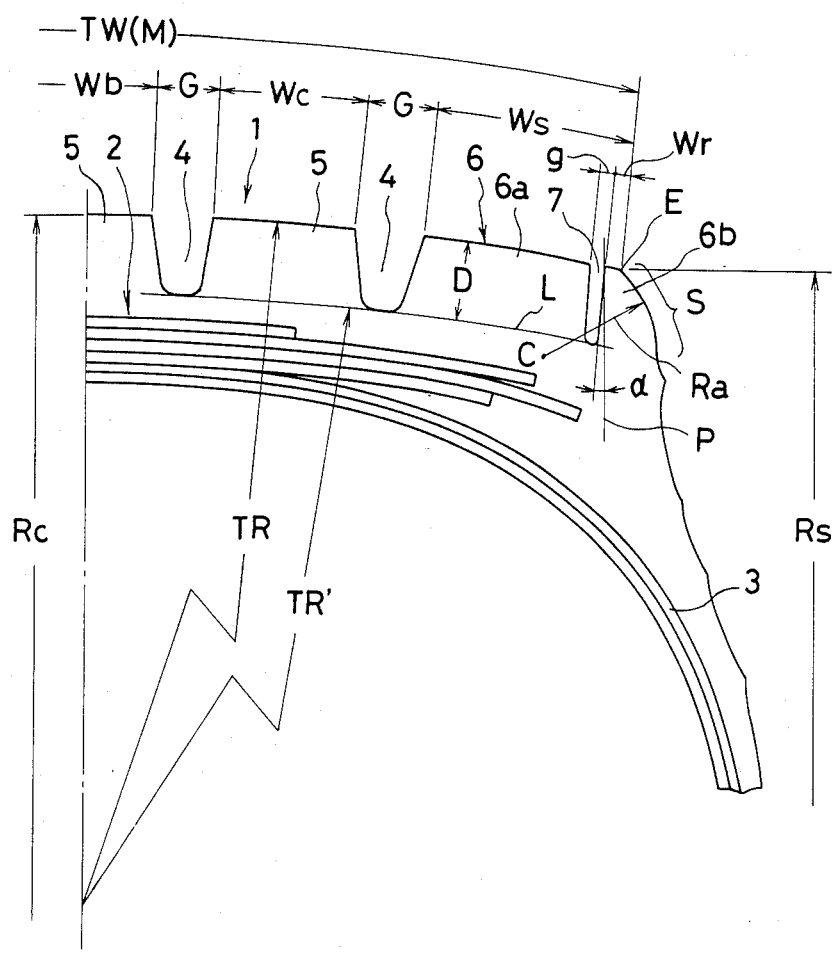
FIG. 1 is a half cross-sectional view of the tread portion of one form of the heavy-duty pneumatic radial tire according to the present invention.
Figure 2:
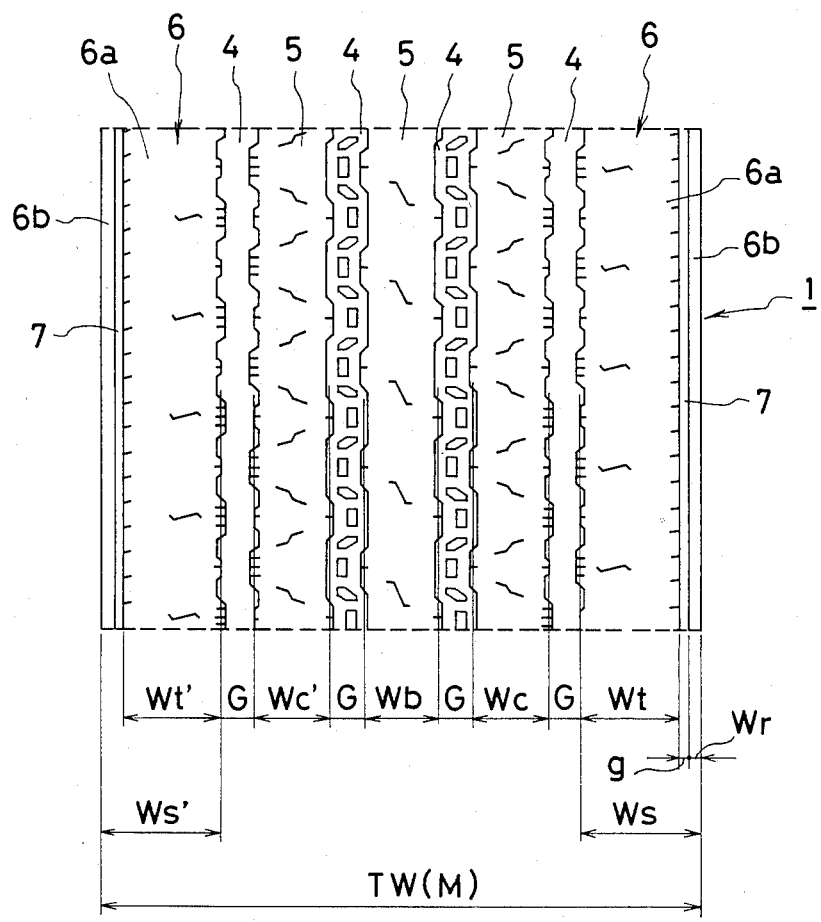
FIG. 2 is a plan view of the tread surface of the heavy-duty pneumatic radial tire as shown in FIG. 1.

In FIGS. 1 and 2 showing the heavy-duty radial tire of the present invention, numeral 1 designates a tread portion, numeral 2 a reinforcing belt arranged on the inside of the tread portion in the circumferential direction of the tire, and numeral 3 a carcass. The carcass 3 comprises at least one reinforcing layer provided at an angle of substantially 90° to the circumferential direction of the tire. A preferred reinforcing cord include a cord of a metal, such as steel, or a cord of an organic fiber, such as nylon, polyester or polyamide fiber. The reinforcing belt 2 comprises at least two layers made of a cord of a metal such as steel and serves to remarkably improve the stiffness of the tread portion 1. It is preferred that the reinforcing belt have the following structure. The reinforcing belt is formed of at least two tension layers and one reinforcing layer. The reinforcing cords of the tension layers are provided at an angle of 15° to 30° to the circumferential direction of the tire. The adjacent layers cross each other in the opposite direction with the circumferential direction of the tire therebetween. Preferably the reinforcing cords of the reinforcing layer are provided at an angle of 40° to 75° to the circumferential direction of the tire.

The tread portion 1 has such a profile that a main area M of contact with the road having a contact width of TW is formed with a circular arc having a radius of curvature of TR, while an auxiliary area S of contact with the road are formed on the both shoulder portions with a radius of curvature of Ra. The main area M of contact with the road serves as the contact area when the vehicle travels straight ahead, while the auxiliary area S of contact with the road serves as the contact area when the vehicle travels at the corner portions of the road or passes over a rut. In the radial tire of the present invention, the circular arc forming the main area M of contact with the road and the circular arc forming the auxiliary area S of contact with the road cross each other to form the edge-shaped boundary E.

A plurality of main grooves 4, . . . , 4 are provided on the tread surface of the main area M of contact with the road in the circumferential direction of the tire. The main grooves form ribs 5, 5, 5 respectively having widths of Wc, Wb and Wc' on the central portion of the tread and form ribs 6, 6 respectively having widths of Ws and Ws', which are larger than the widths of the ribs 5, on both shoulder portions. Further, the ribs 6 of the shoulder portions are provided, near the end thereof, with linear narrow grooves in the circumferential direction of the tire. The narrow grooves 7 each have a width of g, which is much smaller than the width G of the main grooves 4, and a depth of D which is the same as the depth of the main grooves. The narrow groove 7 partitions the rib 6 into a partitioned rib 6a located towards the center of the tread and a partitioned rib 6b located towards the lateral edge.

As mentioned above, in the radial tire of the present invention, the narrow grooves 7, 7 are provided respectively on the end portions of both shoulder portions of the main area M of contact with the road in the tread portion. Further, the auxiliary areas S, S of contact with the road having a round shape are provided respectively on the both ends of the main area M of contact with the road. The auxiliary area S of contact with the road is provided on the inside thereof with the narrow groove 7. The main area M of contact with the road and auxiliary area S of contact with the road are formed so that the circular arcs of the both areas cross each other to form a definite edge-shaped boundary E. In the present invention, it is very important to form such a definite boundary E. This is because the presence of the edge-shaped boundary suppresses the occurrence of relative sliding of the shoulder areas towards the center of the tread surface, which in turn suppresses the remarkable wear of the shoulder portions which is a kind of the uneven wear.

Further, in the present invention, it is required that the radius of curvature, Ra, for forming the circular arc of the auxiliary area S of contact with the road be large than the depth D of the main grooves and smaller than the value five times as much as the depth D of the main grooves (i.e., 5×D). It is preferred in this connection that the center C of the radius of curvature, Ra, is present in the inside of the tire as compared with a line L passing the bottom of the groove of the partitioned rib 6b parallel to the tread surface. Such a radius of curvature serves to improve the contact of the tire with the road, leading to excellent driving stability.

In the radial tire of the present invention, it is preferred that the difference between the radius of rotation, Rc, defined as a distance from the rotating shaft of the tire to the center of the tread surface, and the radius of rotation, Rs, defined as a distance from the rotating shaft of the tire to the edge-shaped boundary E, i.e., (Rc−Rs) be minimized and be 2% or less of the radius of rotation, Rc, at the most. This suppresses the relative sliding of the shoulder areas towards the central portion of the tread surface, which in turn suppresses the remarkable wear of the shoulder portions.

In the present invention, it is required that the narrow grooves are linearly provided on the shoulder portions. If the narrow grooves have a zigzag or curved shape, the width of the partitioned rib 6b provided on the side edge varies along the circumferential direction of the tire, which leads to variation of the stiffness. The variation of the stiffness along the circumferential direction of the tire brings about the irregular wear of the shoulder portions, which deteriorates the cornering performance. For example, when the narrow grooves have a zigzag shape, the edges of the shoulder portions have a polygonally deformed shape, as viewed from the side.

Further, it is necessary that the narrow groove be provided so that the groove width g is in the range of 1.5 to 5 mm, while the distance Wr from the narrow groove to the edge-shaped boundary E is in the range of 1.5 to 5 mm. It is preferred that the above-mentioned distance Wr be equal to or larger than the groove width g in the range of 1.5 to 5 mm. The provision of the narrow grooves in the above-mentioned specific positions lowers the shearing stiffness which opposes the lateral force of the partitioned ribs 6b provided on the side edges. This in turn lowers the camber thrust which acts when the tire passes over a rut, thereby enabling an improvement in the wandering preventing performance. On the other hand, when the narrow grooves are provided near the center of the tread as compared with the above-mentioned position, as in the conventional tires, the shearing stiffness of the partitioned rib 6b is enhanced, which leads to a lowering in the wandering preventing performance. Further, the provision of the narrow grooves near the tread substantially reduces the development width of the tread surface, which lowers the wear resistance.

When the width of the narrow grooves is less than 1.5 mm, the effect accompanying the provision of the narrow grooves cannot be attained. Specifically, in such a case, the partitioned ribs 6b and 6a facing each other with the narrow groove 7 provided therebetween are substantially united with each other, which makes it impossible to attain sufficient lowering in the shearing stiffness of the partitioned rib 6b provided on the side edge, thereby leading to an insufficient improvement in the wandering preventing performance. On the other hand, when the width of the narrow grooves is larger than 5 mm, the partitioned rib 6b is separated from the partitioned rib 6a to a large extent, which lowers the relaxing effect attained by catching the partitioned rib 6b, which falls by the action of lateral force, with the partitioned rib 6a, which deteriorates the wandering preventing performance.

Further, the narrow grooves should satisfy the following requirements besides the above-mentioned requirements with respect to the width and position of the grooves. The direction of the narrow grooves should be inclined towards the inside of the tire relative to the perpendicular P to the rotating shaft of the tire and, at the same time, the angle $\alpha$ thereof to the perpendicular P should be in the range of 1° to 5°. Further, it is required that the bottoms of the narrow grooves be present together with the bottoms of the main grooves on an imaginary line L drawn parallel to the circular arc of the main area M of contact with the road. Specifically, the narrow grooves and main grooves are provided so that the bottoms of the narrow grooves and main grooves are present on an imaginary line L comprised of an circular arc having a radius of curvature, TR', of which the center O is the same as the radius of curvature, TR, and the depths of the narrow grooves and main grooves are the same with each other and are D.

When the distance Wr from the edge-shaped boundary E to the narrow groove is small as mentioned above, the width of the partitioned rib 6b provided on the side edge is small. If the direction of the narrow grooves is inclined towards the outside of the tire relative to the above-mentioned perpendicular P, the stress is concentrated on the bottom of the narrow grooves, which brings about occurrence of cracking extending in the lateral direction. In an extreme case, the partitioned rib 6b often falls off. For this reason, it is very important in the present invention to incline the direction of the narrow grooves towards the inside of the tire relative to the perpendicular P. This suppresses the occurrence of cracking caused on the bottom of the narrow grooves as well as the deterioration of the wear resistance. Further, it is required that the angle $\alpha$ of inclination with respect to the direction of the narrow groove towards the inside of the tire relative to the perpendicular P be in the range of 1° to 5°. When the angle $\alpha$ exceeds 5°, the stiffness of the partitioned rib 6b is increased, which leads to the deterioration of the wandering preventing performance.

When the depth of the narrow groove is smaller than that of the main groove as opposed to the present invention in which the depths of the both grooves are the same with each other, the wandering preventing performance is deteriorated, although the cracking does not occur at the bottom of the grooves. This in turn deteriorates the wear resistance. On the other hand, when the depth of the narrow grooves is larger than that of the main grooves, cracking tends to occur at the bottom of the narrow grooves, although the uneven wear resistance is improved.

Further, in the present invention, it is required that the ribs present on the shoulder portions be each partitioned into two portions with the above-mentioned narrow groove so that the width Wt of the partitioned rib 6a which has been partitioned towards the center of the tread is equal to or larger than the width of the remaining ribs 5, 5, 5 which are present near the center of the tread as compared with the partitioned rib 6a. When the widths Wc, Wb and Wc' of a plurality of ribs 5, ..., 5 are different from each other, the width Wt of the partitioned rib 6a should be equal to or larger than the maximum width of them. When the width of the partitioned rib 6a is smaller than the ribs 5 which are located near the center of the tread as compared with the partitioned rib 6a, not only the cornering power is lowered but also the driving stability is deteriorated when the wandering phenomenon occurs.

In the present invention, since the width of the partitioned rib 6a is equal to or larger than the width of the ribs 5 which are located near the center of the tread, the stiffness of the partitioned rib 6a is equal to or higher than that of the ribs 5, which suppresses the lowering in the cornering power. This suppression in turn leads to the suppression of lowering in driving stability on a rutted road as well as the suppression of the wandering phenomenon. However, when the stiffness of the partitioned rib 6a is too high as compared with that of the ribs 5 which are located near the center of the tread, a rib punch occurs, leading to rapid wearing of the ribs 5. Therefore, it is preferred that the upper limit of the width Wt of the partitioned rib 6a be 1.4 times or less the width of the ribs 5.

In the present invention, when the main grooves have a zigzag shape, the average value of the maximum value and the minimum value is taken as the rib width or main groove width, as shown in FIG. 2.

EXAMPLE

Five types of heavy-duty radial tires, A, B, C, D, and E, were produced so that they have the same size and structure with each other as described in the following item "Common Conditions," while their tread portions are different from each other based on the rib pattern as described in the following item "Types of Tires." Among the five tires, the tire A fall within the scope of the present invention while the other tires, i.e., tires B, C, D, and E, are comparative ones. Further, among the comparative tires, the tire E is generally known while the tires B, C, and D were prepared only for comparison with the tire A of the present invention.

(Common Conditions)

Size of Tire: 1000R20 14PR
Structure of Tire:
   Carcass layer: one layer structure comprising steel cords arranged at 90° to the circumferential direction of the tire
   Reinforcing belt layer: a laminated structure of four belt layers each comprising steel cords in which the cord angles (relative to the circumferential direction of the tire) of the first layer which is in contact with the carcass, the second layer, the third layer and the fourth layer are, respectively, +57°, +18°, −18° and −18°.
   Shape of the shoulder portion: forming an edge-shaped boundary (Types of Tires)

Tire A (Present Invention)

Shape of the narrow groove: linear
Width of the narrow groove, g: 3 mm
Distance from the narrow groove to the edge-shaped boundary, Wr: 3 mm
Angle of the narrow groove, $\alpha$: 3° (inclined towards the inside of the tire)
Depth of the narrow groove, D: 15 mm (the same as the depth of the main groove)
Width of the main groove, G: 12 mm
Width of the partitioned rib, Wt: 35.5 mm
Width of the ribs which are located near the center of the tread, Wc, Wb and Wc': 29 mm (maximum value)

Tire B (Comparative Tire)

Shape of the narrow groove: linear
Width of the narrow groove, g: 3 mm
Distance from the narrow groove to the edge-shaped boundary, Wr: 3 mm
Angle of the narrow groove, $\alpha$: 3° (inclined towards the inside of the tire)
Depth of the narrow groove, D: 12 mm (80% of the depth of the main groove)
Width of the main groove, G: 12 mm
Width of the partitioned rib, Wt: 35.5 mm
Width of the ribs which are located near the center of the tread, Wc, Wb and Wc': 29 mm (maximum value)

Tire C (Comparative Tire)

Shape of the narrow groove: linear
Width of the narrow groove, g: 3 mm
Distance from the narrow groove to the edge-shaped boundary, Wr: 3 mm
Angle of the narrow groove, $\alpha$: 3° (inclined towards the inside of the tire)
Depth of the narrow groove, D: 18 mm (120% of the depth of the main groove)
Width of the main groove, G: 12 mm
Width of the partitioned rib, Wt: 35.5 mm
Width of the ribs which are located near the center of the tread, Wc, Wb and Wc': 29 mm (maximum value)

Tire D (Comparative Tire)

Shape of the narrow groove: linear
Width of the narrow groove, g: 2 mm
Distance from the narrow groove to the edge-shaped boundary, Wr: 3 mm
Angle of the narrow groove, $\alpha$: −3° (inclined towards the outside of the tire)
Depth of the narrow groove, D: 15 mm (the same as the depth of the main groove)
Width of the main groove, G: 12 mm
Width of the partitioned rib, Wt: 35.5 mm
Width of the ribs which are located near the center of the tread, Wc, Wb and Wc': 29 mm (maximum value)

Tire E (Comparative Tire)

Shape of the narrow groove: zigzag (having an amplitude of 4 mm)
Width of the narrow groove, g: 0.8 mm
Distance from the narrow groove to the edge-shaped boundary (distance to the center of the amplitude of zigzag), Wr: 16.5 mm
Angle of the narrow groove, $\alpha$: −3° (inclined towards the outside of the tire)
Depth of the narrow groove, D: 15 mm (the same as the depth of the main groove)
Width of the main groove, G: 12 mm
Width of the partitioned rib, Wt: 21 mm
Width of the ribs which are located near the center of the tread, Wc, Wb and Wc': 29 mm (maximum value)

The above-mentioned five types of tires, A, B, C, D, and E, were tested on the wandering preventing performance, wear resistance, uneven wear resistance and anticracking of the narrow grooves by the methods as will be described below. The results are shown in the below Table.

(1) Test on wandering preventing performance

The tires to be tested were mounted on a vehicle having a weight of 3910 kg in terms of weight in a nonloaded state (the weight of the shaft of a steering wheel). The test was conducted in a nonloaded state by ten test drivers in such a manner that the vehicle was traveled on a test road having a rut at a speed of 80 to 90 km/hr while traveling the vehicle straight ahead in the rut, travelling the vehicle in or out of the rut or intentionally colliding the tire against the wall of the rut. The tires were evaluated based on the feeling of the drivers according to the 10-point method, taking the level of a bias tire as 6 points. The wandering preventing performance was expressed in terms of an average of the points by the ten drivers.

The grading of the above-mentioned feeling was conducted taking into consideration the frequency of occurrence of the wandering phenomenon, extent of movement accompanying the occurrence of the wandering phenomenon, quickness of movement accompanying the occurrence of the wandering phenomenon, convergence of the wandering phenomenon, response of the steering wheel, behavior of the vehicle in going in or out of the rut, etc.

(2) Wear resistance test

The depths of all the main grooves of the tires tested were measured in terms of mm to one decimal place before and after the practice of a 50000-km traveling of the vehicle. The average value of the data on the difference between the depths of the main grooves measured before and after the test traveling was regarded as the amount of the wear. Subsequently, the travelling distance (50,000 km) was divided by the amount of the wear to determine the travelling distance per mm of the amount of the wear. The value thus obtained was regarded as the wear resistance value.

In the Table, the wear resistance determined on each tire was expressed in terms of an index taking the wear resistance of the tire A (tire of the present invention) as 100.

(3) Uneven wear resistance test

In the above-mentioned wear resistance test, the depths of the main grooves which are located near the center of the tread as compared with the ribs provided on the shoulder portions (rib 6 in FIG. 1) and the depth of the narrow grooves were measured before and after practice of the test traveling. The difference between the values obtained in the measurements with respect to each groove before and after the practice of the test traveling was regarded as the amount of the wear. Further, the difference between the amount of the wear of the main groove side and that of the narrow groove side was calculated, and the value thus obtained was regarded as the amount of the uneven wear. Further, the traveling distance (50,000 km) was divided by the amount of the uneven wear to determine the traveling distance per mm of the amount of the uneven wear. The value thus obtained was regarded as the uneven wear resistance value.

In the Table, the uneven wear resistance determined on each tire was expressed in terms of an index taking the uneven wear resistance of the tire A (tire of the present invention) as 100.

(4) Test on cracking resistance of the narrow grooves

The tires to be tested were previously heat-aged by placing them in an oven of 100° C. for two weeks. Thereafter, the tires were traveled using a laboratory rotating drum tester having a diameter of 1707 mm under the following conditions: internal pressure of tire, 7.25 kg/cm$^2$; load, about 2200 kg; speed, 45 km/hr; and slip angle, ±2° (cyclic variation). After a 100-hr traveling the tires were examined on the occurrence of cracking at the bottom of the narrow grooves. The occurrence of the cracking was examined about the entire periphery of the narrow grooves. Further, the portion where the largest crack occurred was examined with the naked eye and cut in the cross direction to determine the length of the crack in terms of mm. The length of the crack thus obtained was used as an index of the cracking resistance.

TABLE

| tires | A | B | C | D | E |
| --- | --- | --- | --- | --- | --- |
| wandering preventing performance | 6 points | 5 points | 6 points | 7 points | 4 points |
| wear resistance | 100 | 100 | 98 | 100 | 82 |
| uneven wear resistance | 100 | 88 | 98 | 97 | 87 |
| cracking resistance (mm) | 0 | 0 | 1.5 | 2.0 | 0 |

As can be seen from the above Table, the tire A of the present invention and the comparative tires B, C and D exhibited a level (6 points) equal to that of the bias tire in the wandering preventing performance or a level close to that of the bias tire, while the comparative tire E exhibited a low level of a wandering preventing performance due to the large distance, Wr, from the narrow grooves to the edge-shaped boundary. The comparative tires B, C, and D which exhibited a satisfactory wandering preventing performance were inferior in wear resistance or irregular wear resistance to the tire A of the present invention. Further, the occurrence of cracking was observed at the bottom of the narrow grooves of the comparative tire D.

The comparative tire E was not only inferior in wandering preventing performance but also remarkably inferior in wear resistance and uneven wear resistance to the tire A of the present invention.

Separately, a comparative tire F was further prepared. The comparative tire F had substantially the same structure as the tire A, except that no edge-shaped boundary E was provided and that, therefore, the main area of contact with the road is smoothly and continuously connected to the auxiliary area of contact with the road. The above-mentioned uneven wear test was conducted on the tire F. As a result, it was found that the wear resistance of the tire F was 97 taking the wear resistance of the tire A as 100.

Further, a comparative tire G was prepared. The tire G had substantially the same structure as the tire A, except that the narrow grooves were provided in a zigzag form instead of a linear form so as to have a width of the narrow grooves of 2 mm, an amplitude of the zigzag of 3 mm, and a distance from the edge-shaped boundary to the center of the amplitude of the zigzag, Wr, of 3 mm. The above-mentioned uneven wear test was conducted on the tire G. As a result, it was found that the wear resistance of the tire G was 92 taking the wear resistance of the tire A as 100. Further, the shape of the outer shell of the shoulder portions with respect to the tire G was in a polygonally deformed state as viewed from the side.

As is apparent from the foregoing description, the heavy-duty pneumatic radial tire of the present invention, having a linear narrow groove provided in the rib of each shoulder portion along the circumferential direction of the tire with the minimized width of partitioned rib partitioned by the narrow groove and provided on the side edge, exhibits a wandering preventing performance comparable to that of the bias tire. Further, in the heavy-duty pneumatic radial tire of the present invention, the occurrence of cracking can be eliminated, despite of the narrow width of the partitioned rib, without sacrificing the wear resistance and uneven wear resistance by balancing the shapes of the other portions.

We claim:

1. A heavy-duty pneumatic radial tire comprised of a carcass of at least one layer, a reinforcing belt comprising at least two metal cord layers and provided on the outer periphery of the tread portions, a plurality of ribs formed in the main tread area of contact with the road and partitioned by a plurality of main grooves extending into the circumferential direction of the tire, narrow grooves provided in the ribs located in the shoulder portions and having a width narrower than that of the main grooves, and an auxiliary area of contact with the road provided at the edge of each of both shoulder portions and having a round shape, wherein said main area of contact with the road is formed with a circular arc, having a large radius of curvature, which crosses another circular arc having a small radius of curvature, Ra, to form an edge-shaped boundary, said radius of curvature, Ra, being larger than the depth of said main grooves and smaller than the value five times as much as the depth of said main grooves, wherein said narrow grooves each are linearly provided in the circumferential direction of the tire and at a distance of 1.5 to 5 mm away towards the center of the tread surface from said edge-shaped boundary and have a groove width in the range of 1.5 to 5 mm, the direction of said narrow grooves being inclined at an angle in the range of 1° to 5° relative to the perpendicular to the rotating shaft of the tire, the bottoms of said narrow grooves and the bottoms of said main grooves being present on an imaginary line drawn parallel to the circular arc of said main area of contact with the road, and wherein the widths of the partitioned ribs, located on the side of the center of the tread surface, among the partitioned ribs formed by partition with said narrow grooves, are equal to or larger than the maximum width of the remaining ribs which are present near the center of the tread surface as compared with said partitioned ribs.

2. A heavy-duty pneumatic radial tire according to claim 1, wherein the distance from the said narrow groove to said edge-shaped boundary is equal to or larger than the depth of said narrow grooves.

3. A heavy-duty pneumatic radial tire according to claim 1, wherein the width of said partitioned rib partitioned towards the center of the tread surface is 1.4 times or less the maximum width of the remaining ribs which are present near the center of the tread surface as compared with said partitioned rib.

4. A heavy-duty pneumatic radial tire according to claim 1, wherein the difference (Rc−Rs) between a radius of rotation, Rc, defined as a distance from the rotating shaft to the center of the tread surface and a radius of rotation, Rs, defined as a distance from the rotating shaft of the tire to said edge-shaped boundary is 2.0% or less of said radius of rotation, Rc.

5. A heavy-duty pneumatic radial tire according to claim 1, wherein the center of the circular arc having a radius of curvature, Ra, forming said auxiliary area of contact with the road is present on the inside of the tire as compared with said imaginary line passing the bottoms of said narrow grooves and bottoms of said main grooves.

6. A heavy-duty pneumatic radial tire according to claim 1, wherein said reinforcing belt is comprised of at least two tension layers and at least one reinforcing layer, said tension layers each comprising reinforcing cords crossing the circumferential direction of the tire at an angle in the range of 15° to 30°, said reinforcing layer comprising reinforcing cords crossing the circumferential direction of the tire at an angle in the range of 40° to 75°.

* * * * *